HIGH-SPEED TUNNEL DIODE ADDER
Filed April 29, 1963 2 Sheets-Sheet 1
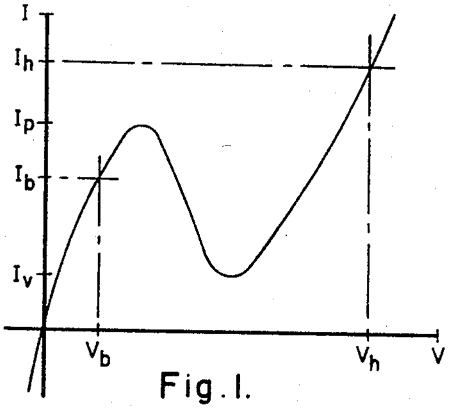
Fig. 1.
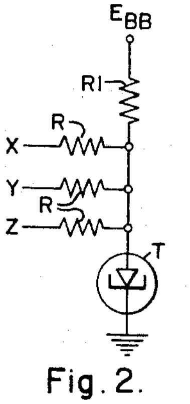
Fig. 2.
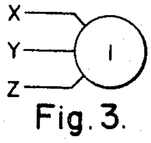
Fig. 3.
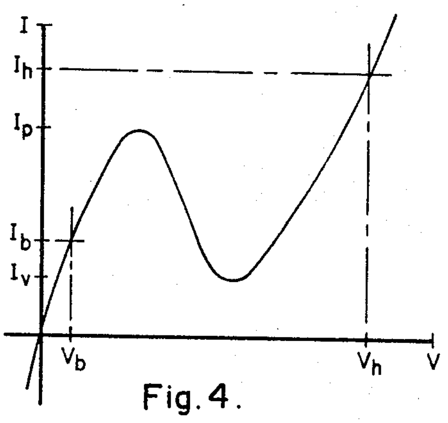
Fig. 4.
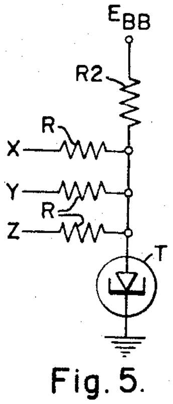
Fig. 5.
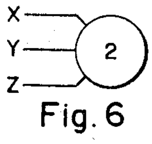
Fig. 6
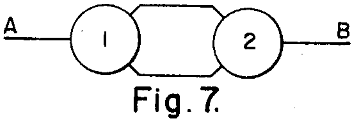
Fig. 7.
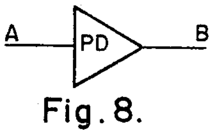
Fig. 8.
Fig. 10.
| A | B | $C_{in}$ | S | $C_{out}$ |
|---|---|---|---|---|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 0 | 1 | 0 | 1 |
| 1 | 1 | 0 | 0 | 1 |
| 1 | 1 | 1 | 1 | 1 |

Oct. 18, 1966 T. A. JEEVES 3,280,316

HIGH-SPEED TUNNEL DIODE ADDER

Filed April 29, 1963 2 Sheets-Sheet 2

United States Patent Office 3,280,316
Patented Oct. 18, 1966

3,280,316
HIGH-SPEED TUNNEL DIODE ADDER
Terry A. Jeeves, Penn Hills Township, Allegheny County, Pa., assignor to Westinghouse Electric Corporation, East Pittsburgh, Pa., a corporation of Pennsylvania
Filed Apr. 29, 1963, Ser. No. 276,249
3 Claims. (Cl. 235—172)

The present invention relates to binary full adder circuitry, and more particularly to high-speed binary full adder circuitry utilizing tunnel diode logic elements.

A binary full adder circuit, which provides binary sum and carry signals of three incoming signals in binary number form, is one of the basic elements in a digital computer. The binary addition function may be provided by a number of circuits. However, many of these require a large number of logic elements and require a relatively long time to generate the desired sum and carry output signals. With the advent of tunnel diodes and their use in logic circuitry many of these problems have been eliminated. Moreover, through the combination of tunnel diode logic elements protection to the various stages of the adder circuitry may be provided.

It is therefore an object of the present invention to provide new and improved binary adder logic circuitry in which tunnel diode logic elements are utilized.

It is a further object of the present invention to provide new and improved binary adder circuitry in which tunnel diode logic elements are utilized and which the adder has a minimum number of elements and is fast acting.

It is a further object of the present invention to provide new and improved binary adder circuitry in which tunnel diode logic elements are utilized and in which the various stages of the adder are protected against spurious signals.

Broadly, the present invention accomplishes the above cited objects by operatively interconnecting tunnel diode logic elements in such a manner to provide the sum and carry output signals, and also the complement of these signals from incoming addend, augend and carry input signals, while also protecting the various generating stages of the adder circuitry.

These and other objects will become more apparent when considered in view of the following specification and drawings, in which:

FIGURE 1 is a current versus voltage characteristic of a tunnel diode as utilized in the circuitry of FIG. 2;

FIG. 2 is a one unit threshold tunnel diode logic circuit;

FIG. 3 is a symbolic diagram of the circuit of FIG. 2;

FIG. 4 is the current versus voltage characteristic curve of the tunnel diode as used in FIG. 5;

FIG. 5 is a schematic diagram of a two unit threshold tunnel diode logic element;

FIG. 6 is a symbolic diagram of the circuit of FIG. 5;

FIG. 7 is a symbolic diagram showing the interconnection to provide a pseudo-diode logic circuit;

FIG. 8 is a symbolic diagram of the pseudo-diode circuit of FIG. 7;

FIG. 10 is the truth table for the operation of a binary full adder circuit.

Figure 9:
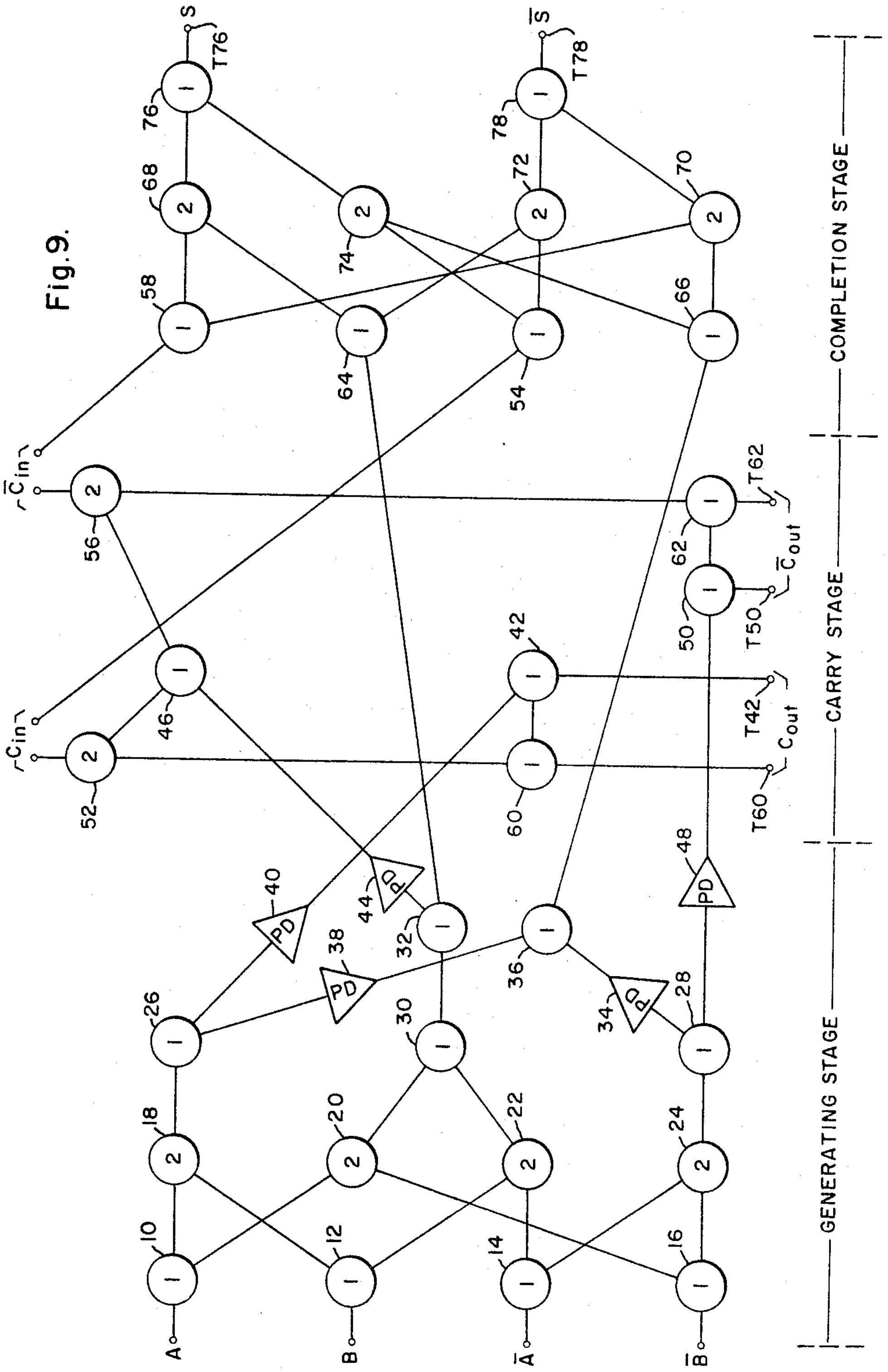
FIG. 9 is a symbolic diagram of the binary full adder circuitry of the present invention.

The present adder circuit will be fabricated from three basic tunnel diode logic elements, which will be termed herein: one unit input threshold level diodes, two unit input level threshold diodes and pseudo-diode circuits. These tunnel-diode logic elements are fully described in copending application Serial No. 71,996, filed November 28, 1960, now U.S. Patent No. 3,209,160, by the same inventor and assigned to the same assignee as the present invention. For purposes of explanation these logic elements will be briefly described herein.

Referring to FIGS. 1 and 2, a tunnel-diode T having its cathode electrode connected to ground and its anode electrode connected to a biasing potential $E_{BB}$ through a biasing resistor R1, has connected at the junction of the resistor R1 and the anode electrode of the tunnel-diode T, three input terminals X, Y and Z through the current limiting input resistors R, respectively. By the proper selection of the biasing resistor R1 a voltage $V_b$ will appear across the tunnel-diode T in a forward direction so that a biasing current $I_b$ passes through the tunnel-diode. From FIG. 1, it can be seen that under the current and voltage conditions $I_b$ and $V_b$ the tunnel-diode will be in its positive resistance low voltage state. With the tunnel-diode T being biased at the point $I_b$, $V_b$, if additional current is supplied at any of the input terminals X, Y or Z of sufficient magnitude, the peak current $I_p$ of the tunnel-diode will be exceeded and the diode will be driven in through its negative resistance characteristic to a next stable state, i.e. its high voltage state, at the voltage $V_h$ and at the current $I_h$. The bias condition of the tunnel-diode initially at $I_b$, $V_b$ is so selected that a preselected one unit input will cause the tunnel-diode to switch to its high-voltage state. Thus, the device may operate in a binary manner; so that, if no input signal, a ZERO, is applied at each of the input terminals of the device, no output signal will be supplied at the output terminals of the device. Alternately, if an input signal, a ONE, is supplied at any of the input terminals, a ONE output signal will be provided at the output terminal of the device. This is because the one unit input signal, a ONE signal, will be sufficient to drive the tunnel-diode into its high-voltage state, which may serve as a ONE output signal. The one unit logic element of FIG. 2 is shown symbolically in FIG. 3, with the numeral 1 within the circle indicating that it requires a one unit input signal to provide an output signal from the logic element.

Referring to FIGS. 4 and 5, the circuit of FIG. 5 is substantially the same as that of FIG. 2, however, the biasing resistor R2 is selected so that initially the tunnel-diode is biased along its characteristic curve only to the voltage level $V_b$ and the current level $I_b$ in its low-voltage state. At this low-voltage state it will require a two unit input in order to cause a tunnel-diode to switch to its high-voltage state at $V_h$, that is, it wil require a one unit input at at least two input terminals of input terminals X, Y or Z of the device. Thus, the operation of the two unit input threshold diode, is such that with a ONE input signal being applied at at least two input terminals a ONE output signal will appear at the output terminals. With no or only one input signal being applied to the input terminals no output signal will be supplied from the output terminals. Symbolically the logic circuit of FIG. 5 is shown in FIG. 6, with the numeral 2 in the circle being indicative that a two unit input must be provided in order to obtain an output signal from the logic element.

A unidirectional logic element as used in the present adder circuit is shown in FIGS. 7 and 8, and will herein be termed a pseudo-diode circuit. In order to accomplish the unidirectional function of the device a one unit circuit is interconnected directly to a two unit circuit, as is shown in FIG. 7. It may be seen that by applying an input signal to terminal A that output signals will be supplied at the two output terminals of the one unit circuit which will, in turn, be applied to the two unit circuit so that the two unit circuit will provide an output signal at the output terminal B. However, if an input signal is applied at the terminal B the two unit circuit will not function to provide output signals at its output terminal; thus no output signals will appear at the terminal A. Hence, input signals may only pass from A to B, but not from B to A, giving the device a unidirectional characteristic. The symbolic representation shown at FIG. 8 as a triangle with a PD enclosed therein will be used herein in order to symbolically show a pseudo-diode circuit.

FIG. 9 shows a binary adder circuit which incorporates the logic elements as described above. By using the one unit, two unit and pseudo-diode circuits, the binary logic function as described in the truth table of FIG. 10 may be accomplished with the circuit of FIG. 9. In the truth table of FIG. 10 and the adder circuit of FIG. 9, the augend signals are designated A, the addend signals B, the carry input signals $C_{in}$, the sum signals S and the carry output signals $C_{out}$. The complement signals of these various signals are designated with a bar superscript. The adder circuit is divided into a generating stage, a carry stage and a completion stage. The signals A, B, $\overline{A}$ and $\overline{B}$ are applied to the generating stage to the first row of one unit logic elements 10, 12, 14 and 16, respectively. The one unit logic element 10 is connected to the two unit logic elements 18 and 20 so that its output signals may be transmitted to these two unit logic elements if the signal A is of correct value. The one unit logic element 12 is connected to the two unit element 18 and the two unit element 22. The one unit element 14 is connected to the two unit element 22 and to the two unit element 24, while the one unit element 16 is connected to the two unit elements 20 and 24. The two unit elements 18 and 24 are connected to the one unit elements 26 and 28, respectively. The one unit element 30 is connected to the outputs of the two unit elements 20 and 22, and has its output connected to the one unit element 32. The one unit element 28 is connected through a pseudo-diode circuit 34 to the one unit element 36. The one unit element 26 and 36 are connected by a pseudo-diode 38 therebetween. Pseudo-diode circuits are used to interconnect the generating stage with the carry stage as can be seen by the pseudo-diode 40 connected between the one unit element 26 in the generating stage to the one unit element 42 in the carry stage. The pseudo-diode 44 connects the one unit element 32 in the generating stage to the one unit element 46 in the carry stage, and the pseudo-diode 48 connects the one unit element 28 in the generating stage to the one unit element 50 in the carry stage. Thus, by utilizing the pseudo-diode circuits to so interconnect the carry and generating stages, the generating stage is protected against any spurious signals which might cause a malfunction within the adder circuitry. It should also be noted that it is not necessary in certain instances to use pseudo-diodes to isolate the completion stage from the generating stage in that the incoming signals would not be effected by spurious signals appearing at this stage.

The carry input signals $C_{in}$ which may come from a preceding adder stage, are applied to the two unit element 52 of the carry stage and also to the one unit element 54 of the completion stage. The complement of the carry input signal $\overline{C}_{in}$ is applied to the two unit element 56 and also to the one unit element 58. The two unit element 52 has its output terminals connected to the one unit element 46 and to the one unit element 60. The one unit elements 60 and 42 are interconnected, and the outputs from these elements give the carry output signals $C_{out}$ at each of the output terminals T60 and T42. The complement of the carry output signal $\overline{C}_{out}$ is provided by the one unit element 50 at the terminal T50, and by the one unit element 62, which is connected to the two unit element 56 and also to the one unit element 50, with the carry output signals being given at the terminals T50 and T62.

The generating stage is connected to a completion stage by the one unit element 32 being connected to the one unit element 64 of the completion stage and the one unit element 36 of the generating stage being connected to the one unit element 66 of the completion stage. To complete the generation of the sum signal S and its complement $\overline{S}$, the one unit element 58 is interconnected to the two unit elements 68 and 70, the one unit element 64 is connected to the two unit elements 68 and 72, the one unit element 54 is connected to the two unit elements 74 and 72, and the one unit element 66 connected to the two unit elements 70 and 74. The two unit elements 68 and 74 have their outputs connected to the one unit element 76 which in turn supplies the sum output signals S at its output terminal. The outputs of the two unit elements 70 and 72 are connected to the one unit element 78 which in turn supplies the complement output sum signals $\overline{S}$ at its output terminal.

The operation of the adder of FIG. 9 is such to satisfy the truth table of FIG. 10. In order to better explain this, several examples may prove useful to show that the conditions are satisfied for the various incoming signals to be added. Remembering that for an output signal to appear at a one unit tunnel-diode threshold element only one input signal need be applied to the element, but for a two unit threshold element to provide an output signal an input signal must be applied at two input terminals. Then taking for example the case when the input signals A and B are at a ZERO, or no signal value and the carry input signal is at a ONE value, the complements of these signals are ONE and ZERO, respectively. The sum signal S then should be a ONE and the complement signal $\overline{S}$ a ZERO. The carry output signal $C_{out}$ should be a ZERO and its complement signal $\overline{C}_{out}$ a one. Thus, with ZERO signals being applied at the terminals A and B, no output signals will be supplied by the one unit elements 10 and 12. However, with ONES being supplied by the complement signals $\overline{A}$ and $\overline{B}$ the one unit elements 14 and 16 will provide output signals to the two unit elements 22 and 24. The element 22 will not supply an output signal as the one unit element 12 supplies no signal to it. The two unit element 24, however, will be supplied by two input signals by the one unit elements 14 and 16, and, thus, will supply an input signal to the one unit element 28, which in turn will apply an output signal through the pseudo-diode 48 to the one unit element 50, which will supply a ONE value complement carry output signal $C_{out}$ at the terminal T50. Also a signal will be applied to the one unit element 62 which will supply a ONE output at the terminal T62. The values at terminals T50 and T60 satisfy the truth table for the complement carry output signal $\overline{C}_{out}$. With a ONE value carry input signal $C_{in}$ being applied to the two unit element 52, no output signal will be supplied to the one unit element 60. Thus the carry output signal at the terminal T60 will have a ZERO value. As the one unit elements 60 and 42 are interconnected and no input signals are applied to the one unit element 42, a ZERO output signal for the carry output signal $C_{out}$ will also appear at the terminal T42; so satisfying the truth table for the given input values. The sum and complement sum signals are generated in the completion stage. Since the one unit 28 of the generating stage supplies a one signal at each of the outputs, a one signal would be applied to the one unit element 36 through the pseudo-diode 34. The one unit element 36 then supplies a ONE signal to the one unit element 66 of the completion stage, which in turn supplies a ONE signal to the two unit element 74 of the completion stage. The two unit element 74 is also supplied an input signal at its other terminal from the one unit element 54, which is energized by the one value of the carry input signal $C_{in}$ being at a one-level. Since the two unit element 74 has two inputs, an output signal will be provided to the one unit element 74 which in turn will supply a one unit sum value S at its output terminal, which satisfies the truth table. The complement sum signal $\overline{S}$ is at a zero level as the two unit element 74 receives only one input signal from the one unit element 54. The other necessary input is not supplied by the one unit element 64 as it is blocked by no input signal being applied thereto. The truth table is therefore satisfied with the sum S and complement of the carry output signal $\overline{C}_{out}$ being at ONE values and the complement of the sum signal $\overline{S}$ and the carry output $C_{out}$ value being at zero levels. Taking another example, with the signals A and B being at ONE values and the carry input signal $C_{in}$ being at a ZERO value. ONE signals being applied to one unit elements 10 and 12, the two unit element 18 is energized to provide an output to the one unit element 26, which provides an output through the pseudo-diode 40 to the one unit element 42 of the generating stage to provide in turn a ONE output signal at the terminal T42 as the carry output signal $C_{out}$. Because the one unit elements 60 and 42 are interconnected, a ONE value also is provided at the other carry output terminal T60. The complement of the carry output signal $\overline{C}_{out}$ is at a ZERO value as no input signals are provided to either of the one unit elements 50 or 62. The sum signal S is at a ZERO value as the two unit element 68 receives only one input signal from the one unit input 58, which is in turn energized by the complement of the carry input signal $\overline{C}_{in}$. The complement of the sum signal $\overline{S}$ is generated in that a ONE signal is applied to the one unit element 36 through the pseudo-diode 38 from the one unit element 26. The one unit element 36 energizes the one unit element 66 of the completion stage which, in turn, supplies a ONE input to the two unit element 70. The other input of the two unit element 70 is supplied by the one unit element 58, which is energized by the complement carry input signal $\overline{C}_{in}$, The two unit element then supplies an output to the one unit element 78 which provides a ONE output signal as the complement of the sum signal $\overline{S}$ at its output terminal T78. It can then be seen that for this example the conditions of the truth table are satisfied, adder circuit functioning satisfies the equations, for the sum signal:

$$S=ABC+\overline{A}B\overline{C}+A\overline{B}\overline{C}+\overline{A}\overline{B}C$$

and for the carry output signal $C_{out}=AB+(A+B)C_{in}$.

Additional advantages of the adder circuit described above may also be noted. These advantages include that the adder may be constructed of tunnel-diodes giving extremely reliable operation. The circuit may be readily miniaturized since the tunnel-diode may be constructed in a single strip of dendritic material. Also through the use of pseudo-diode circuits complete protection from back circuits and spurious signals is provided. By using dual carry outputs the effective length of chain is kept to a minimum of $2n$ elements, where $n$ is the number of stages; thus, in the instant case, to generate a carry output signal, the carry input signal must only be applied to two elements, the two unit input element 52 and the one unit element 60; so providing extremely fast operation. In that advantage is taken of the nondirectional property of the threshold elements the carry chain length is reduced by 50%, and hence the effective speed of the adder is doubled. The operational speed of the adder may be given as $(2n+7)\tau$ in milliseconds where $n$ is the number of stages and $\tau$ is the operational time of one of the tunnel-diode threshold circuits. In actuality $\tau$ may be less than one millimicrosecond. Although the circuit is primarily intended for parallel operation it may economically be used also as a serial adder.

Although the present invention has been described with a certain degree of particularity, it should be understood that the present disclosure has been made by way of example and that numerous changes in the details of fabrication and the combination and arrangement of the elements may be resorted to without departing from the scope and the spirit of the present invention.

I claim as my invention:

1. A binary full adder circuit operative with addend, augend and carry input signals comprising, a generating stage including a plurality of one unit input threshold tunnel diode logic elements and two unit input threshold tunnel diode logic elements interconnected to generate control signals in response to said addend and augend signals, a carry stage including a plurality of one and two unit input threshold tunnel diode logic elements interconnected to generate carry output signals of said addend, augend and carry input signals in response to said control signals and said carry input signals, a completion stage including a plurality of one and two unit input threshold tunnel diode logic elements interconnected to provide the sum output signals of said addend, augend and carry input signals in response to said carry input signals and said control signals, and a plurality of pseudo-diode circuit operatively connected between said generating stage and said carry stage to protect said generator stage against spurious signals causing malfunctions.

2. A binary full adder circuit operative with addend, augend and carry input signals comprising, a generating stage including a plurality of one unit input threshold tunnel diode logic elements and two unit input threshold tunnel diode logic elements interconnected to generate control signals in response to said addend and augend signals, a carry stage operatively connected to said generating stage and including a plurality of one and two unit input threshold tunnel diode logic elements interconnected to generate carry output signals of said addend, augend and carry input signals in response to said control signals and said carry input signals, and a completion stage operatively connected to said generating stage and said carry stage and including a plurality of one and two unit input threshold tunnel diode logic elements interconnected to provide the sum output signals of said addend, augend and carry input signals in response to said carry input signals and said control signals.

3. A binary full adder circuit operative with addend, augend and carry input signals comprising, a generating stage including a plurality of one unit input threshold tunnel diode logic elements and two unit input threshold tunnel diode logic elements interconnected to generate control signals in response to addend and augend signals being applied thereto, a carry stage operatively connected to said generating stage and including a plurality of one and two unit logic elements interconnected to generate carry output signals of said addend, augend and carry input signals in response to said control signals and said carry input signals, a completion stage operatively connected to said generating stage and said carry stage and including a plurality of one and two unit logic elements interconnected to provide the sum output signals of said addend, augend and carry input signals in response to said carry input signals and said control signals, and a plurality of pseudo-diode circuits operatively connected between said generating stage and said carry stage to protect said adder circuit against malfunctions.

References Cited by the Examiner

UNITED STATES PATENTS

| | | | |
|---|---|---|---|
| 3,019,981 | 2/1962 | Lewin | 235—176 |
| 3,094,613 | 6/1963 | Miller | 235—176 |
| 3,113,206 | 12/1963 | Harel | 235—176 |
| 3,125,674 | 3/1964 | Robinovici et al. | 235—172 |
| 3,148,274 | 9/1964 | Davis | 235—172 |
| 3,156,816 | 11/1964 | Kosonocky et al. | 235—172 |
| 3,196,261 | 7/1965 | Schaefer | 235—176 |

MALCOLM A. MORRISON, *Primary Examiner.*

ROBERT C. BAILEY, *Examiner.*

M. A. LERNER, M. SPIVAK, *Assistant Examiners.*